Aug. 18, 1959 — C. T. HUTCHENS — 2,900,197
TANDEM SPRING SUSPENSION SYSTEM
Filed Jan. 13, 1958 — 4 Sheets-Sheet 2

INVENTOR:
Charles T. Hutchens,
BY Cushman, Darby & Cushman
ATTORNEYS.

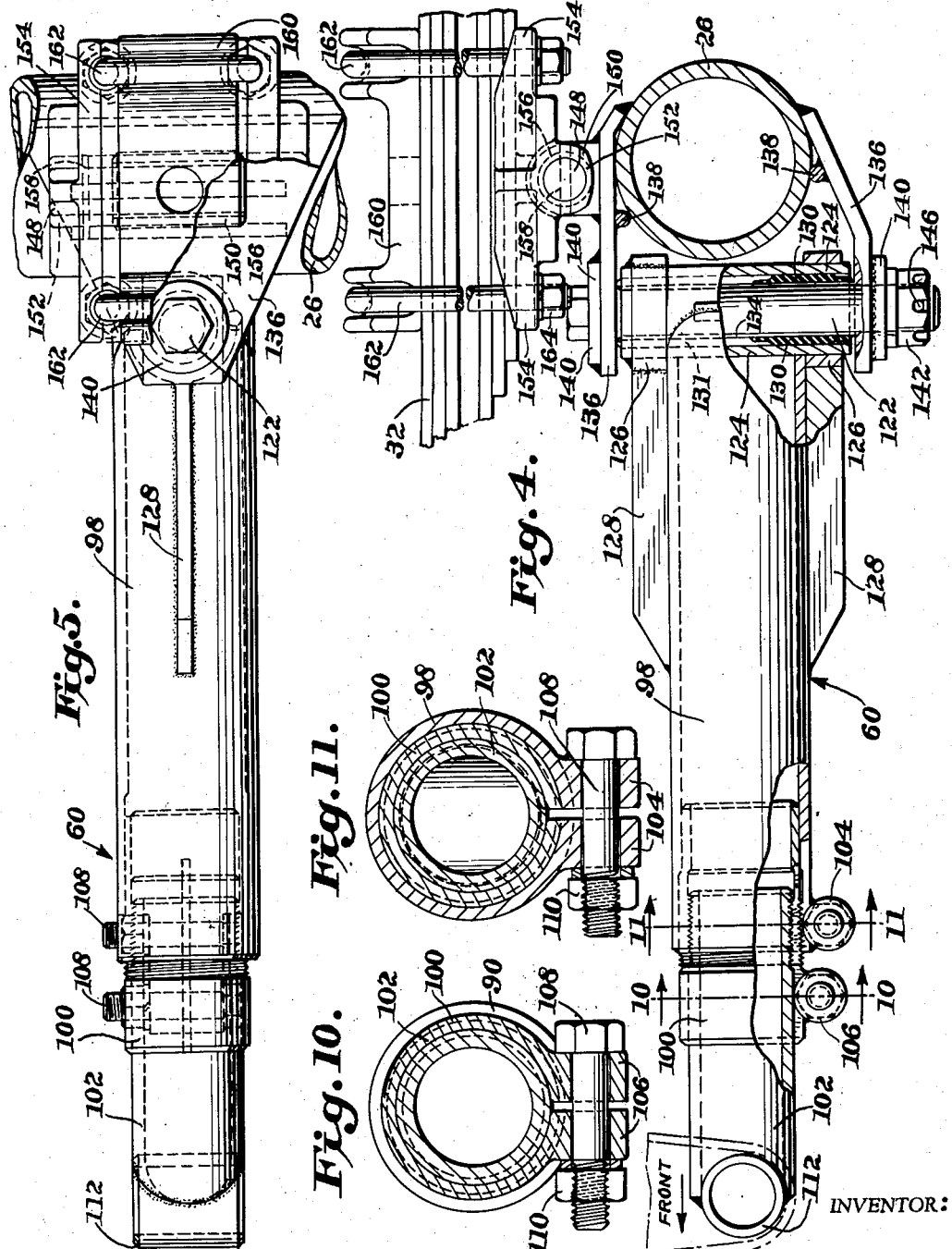

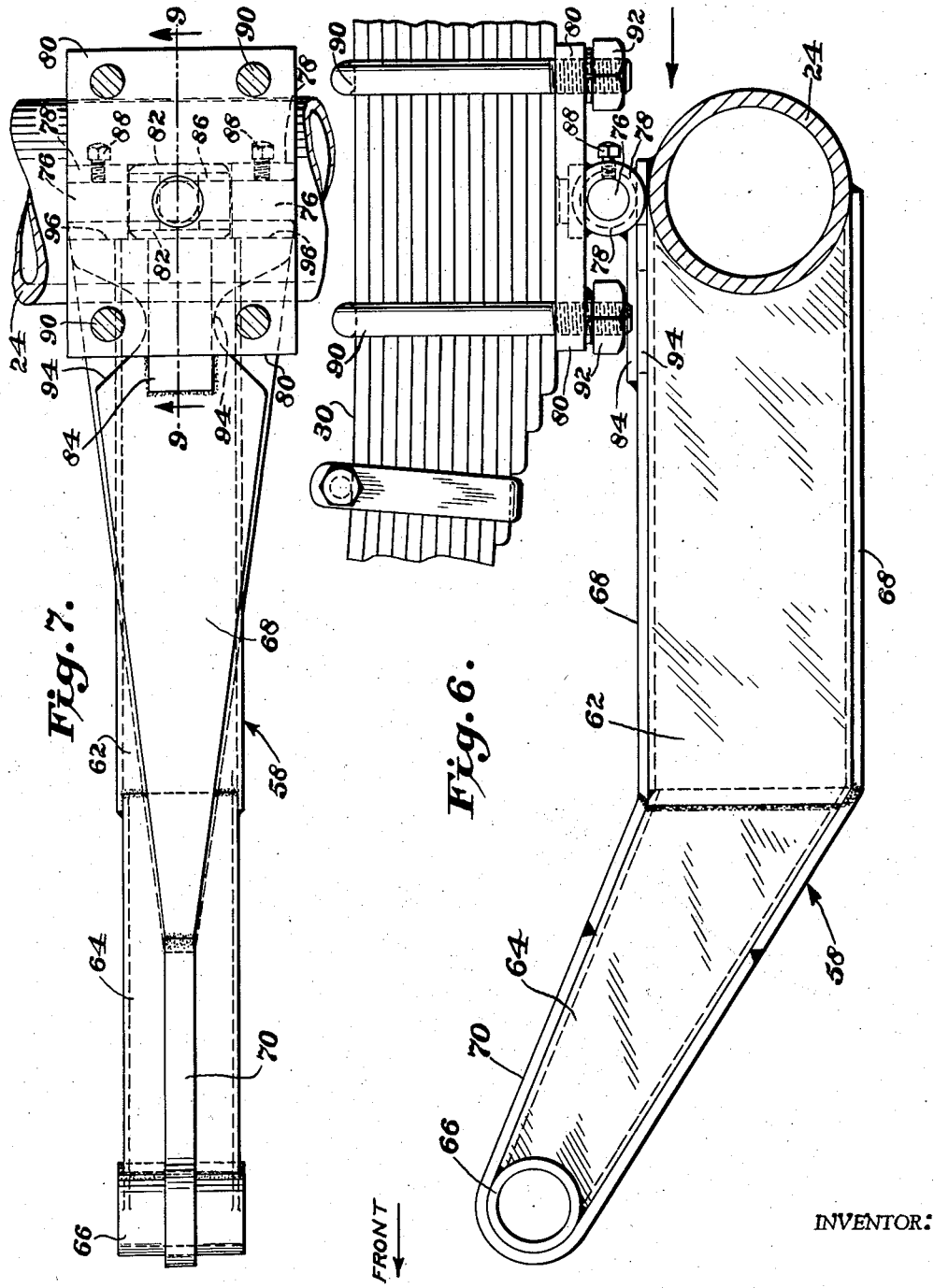

United States Patent Office 2,900,197
Patented Aug. 18, 1959

2,900,197

TANDEM SPRING SUSPENSION SYSTEM

Charles T. Hutchens, Springfield, Mo.

Application January 13, 1958, Serial No. 708,415

2 Claims. (Cl. 280—104.5)

This invention relates to suspension systems and in particular to a tandem axle suspension assembly for trailers and the like.

Conventional tandem axle assemblies for trailers are constructed with four leaf springs, two on each side of the trailer chassis or frame, slidably associated with the frame at six points, with some suitable bracket or equalizer arrangement between the rear of the front spring and the front of the rear spring on each side, and also with hanger brackets supporting the front end of the front springs and the rear end of the rear springs. In such assemblies, when the brakes are applied, forces and torques are produced which tend to bring about undesirable movements of the springs. In such cases, the rear of the front spring will move upwardly while the front of the rear spring will move downwardly thereby causing brake chatter or bouncing of the wheels as well as uneven or unequal braking. In conventional tandem axle assemblies this condition exists, to a greater or lesser degree, every time the brakes are applied, and whether the trailer is loaded or empty.

Some attempts have been made heretofore to overcome this and other drawbacks, but for one reason or another, they have not produced entirely satisfactory results.

Thus, an important object of this invention is to develop a new construction and combination of various parts in tandem axle assemblies to overcome the foregoing and other drawbacks of the prior art.

Another object is to provide a tandem axle assembly, of the type referred to, with a novel construction and arrangement of torque arms on either side of the chassis, wherein each arm extends between the front of one of the springs and the adjacent axle. A related object resides in the provision of a torque arm construction particularly adapted to facilitate proper axle alignment.

Yet another object is to provide an improved trailer suspension assembly, of relatively simple, inexpensive and durable construction, and capable of superior performance.

In accordance with one form of the invention, each of the two axles of the assembly is engaged to the springs on opposite sides of the frame for permitting pivotal or swinging movement of the springs relative to their respective axis. And a pair of longitudinal torque arms is provided on each side of the trailer chassis, each arm being connected at one end to an axle and extending forwardly to a transverse pivot point adjacent the front end of a spring. It is preferred that the transverse pivotal axis providing for the relative movement of the springs be located between the spring and the axle and that at least some of the torque arms be adjustable longitudinally, with such arms being connected to the adjacent axle to provide a vertical pivotal axis therebetween.

Further objects and advantages of the invention will be in part obvious and in part pointed out hereinafter.

The novel features of the invention may be best made clear from the following description and accompanying drawings in which:

Figure 1a is a fragmentary and enlarged side elevational view of the tandem axle assembly of Figure 1 with some of the parts in vertical section;

Figure 4 is an enlarged, partially cut away and sectional elevational view of an adjustable torque arm of the invention and showing the manner in which it, the axle and the spring are connected;

Figure 5 is a plan view of the torque arm of Figure 4;

Figure 6 is an enlarged elevational view of a non-adjustable torque arm of the invention and showing the connection between it and the axle and spring;

Figure 7 is a plan view of the torque arm of Figure 6;

Figure 1:
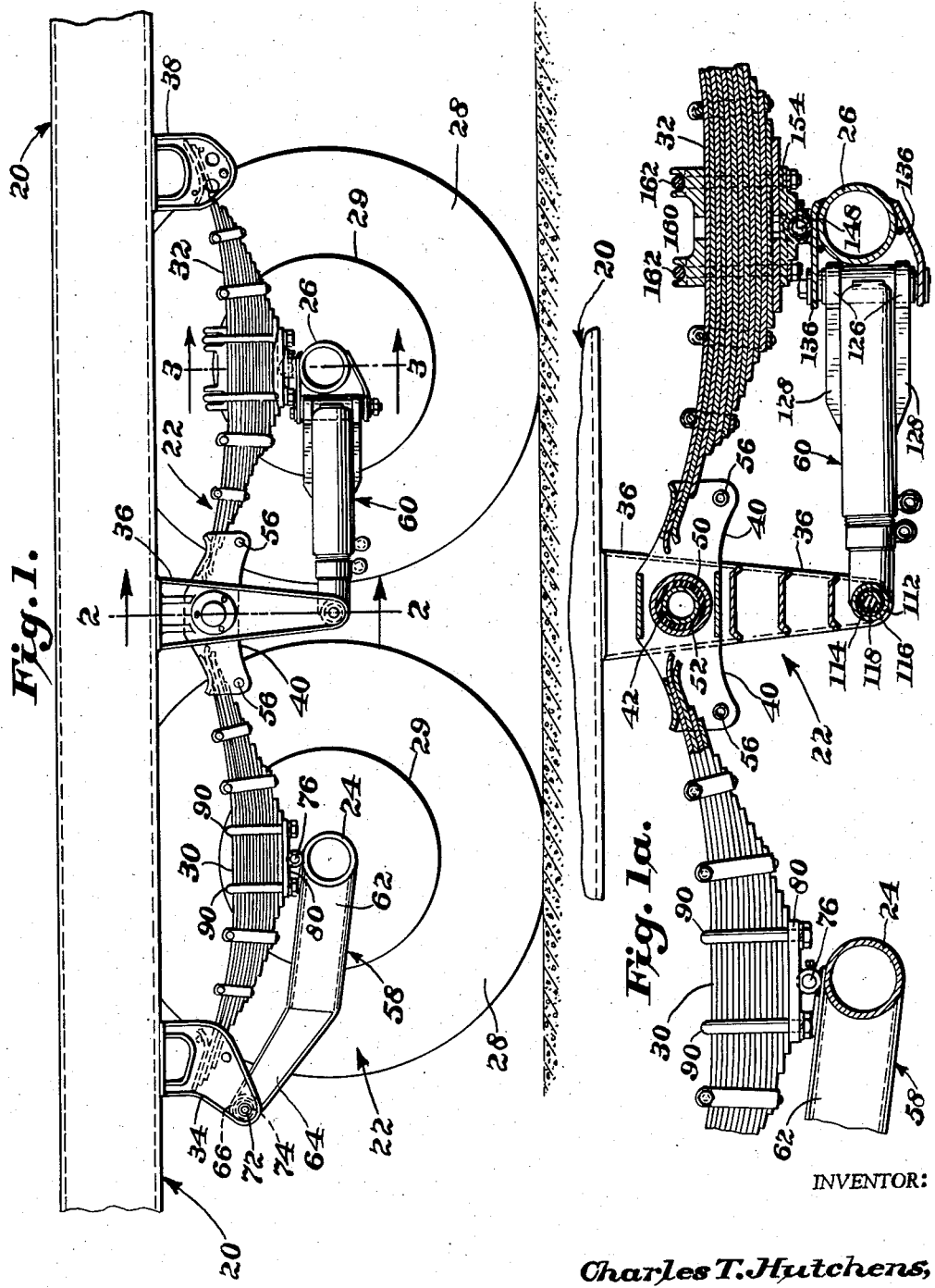
Figure 1 is a fragmentary side elevational view of vehicle chassis or frame provided with a tandem axle assembly embodying the invention.

Figures 10 and 11 are sectional views taken respectively along lines 10—10 and 11—11 of Figure 4.

Referring now to the drawing, numeral 20 indicates a trailer chassis or frame (Figures 1, 1a and 2) of any conventional construction. As viewed in Figure 1, the front or left end of the chassis is not shown, but will be of any known form. A tandem axle assembly of the invention, designated 22, is attached to the frame, as will be later described in detail, and includes spaced front 24 and rear 26 axles mounting the wheels or tires 28 on either side of the frame. Suitable brakes, indicated at 29, will be provided for each wheel, as is customary.

The arrangement shown in Figure 1 constitutes the structure of the assembly 22 at one side of the chassis 20. However, it is to be understood that the assembly includes similar structure, similarly arranged at the opposite side of the frame. Therefore, for the purpose of this description, it should not be necessary to show both sides of the chassis 20 and assembly 22 inasmuch as, for all practical purposes, they may be considered substantially identical.

In connection with the present disclosure, it should be appreciated that where used herein with respect to the frame 20, the terms "longitudinal" and "transverse" respectively mean a direction from front to rear of the frame (left to right as viewed in Figure 1), and a direction generally perpendicular thereto or from side to side of the frame.

The transverse axles 24, 26 are attached to the midpoints of the front 30 and rear 32 leaf springs, provided on each side of the chassis 20 and carried by the brackets or hangers 34, 36, 38 which in turn are suitably connected to the frame 20, as by welding or bolts. Front 34 and rear 38 brackets preferably are constructed so that the ends of the springs will be slidably disposed therein, as indicated.

Figure 2:
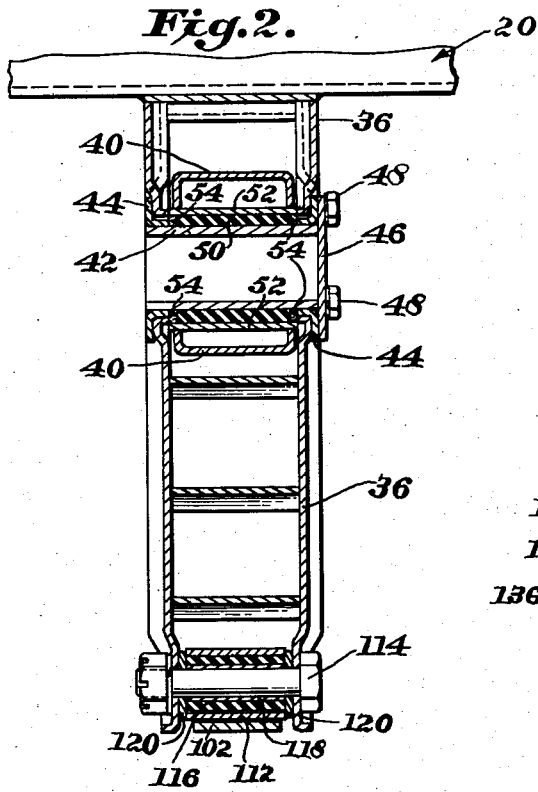
Figure 2 is a sectional view taken along line 2—2 of Figure 1.

Hanger 36 preferably carries what may be termed an equalizer bracket 40 pivotally connected thereto, as by pivot pin 42, and extending longitudinally to either side thereof, for slidably receiving the adjacent ends of the springs 30, 32, as shown in Figure 1a. Referring to Figure 2, this transverse pin 42 will be seen to be suitably secured to the end rings 44 mounted in the bracket side walls, as shown. A small cover 46 may be attached to one of the rings 44, as by the bolts 48. A sleeve bearing 50 embraces the pin 42 and engages the outer sleeve 52 carried by the equalizer bracket 40. Suitable sealing means, such as the grease seals 54 are provided at either end of the bearing 50, as shown, for retaining lubricant on the desired surfaces. Rod members or bolts 56 may be provided at either end of equalizer 40, as best seen in Figures 1 and 1a.

A longitudinal torque arm 58 is provided on each side of the frame 20 between the front axle 24 and the front end of spring 30 while a longitudinal torque arm 60 is also provided on each side of the frame 20 between axle 26 and the front end of spring 32. In accordance with the illustrative form of the invention, a transverse pivotal axis is provided between each of the axles and the adjacent spring, the torque arms 58, 60 are pivotally engaged at their forward ends respectively to brackets 34, 36, and the rearward end of front arm 58 is rigidly attached to the axle 24 while the rearward end of arm 60 is connected to axle 26 in a joint that only permits pivotal or swinging movement of arm 60 about a vertical axis and relative to axle 26. Further in accordance with the invention, the rear arm 60 preferably is constructed so as to be conveniently adjustable in length. As is evident, the arms 58, 60 run parallel with the springs 30, 32.

Figure 8:
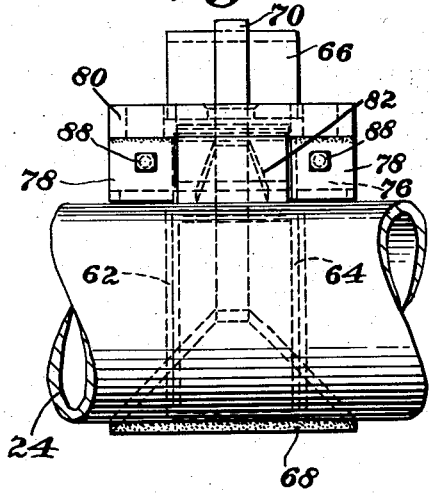
Figure 8 is an end elevational view of the torque arm and axle shown in Figure 6.

Considering first the structure and connections for the front torque arm 58, axle 24 and spring 30, reference should be made to Figures 1, 1a, 2, 3, and 6–9 wherein the arm 58 is shown as including a generally horizontal portion 62 and an upwardly inclined forward portion 64 terminating in the transverse bushing 66. Portions 62, 64 may be of channel shaped configuration, as best seen in Figure 8, suitably connected together as by welding in the manner indicated. Top and bottom, generally triangular plates 68 are engaged to the portions 62, 64, with a U-shaped piece 70 extending around portion 64 and the bushing 66, all of these parts being suitably secured together also as by welding (see Figures 6 and 7).

Bushing 66 is journalled on a pin 72 extending transversely between the spaced side walls of hanger 34, with another bushing 74, of rubber or other desirable resilient material, disposed between the pin 72 and bushing 66, as indicated in Figure 1. Thus the arm 58 is swingable about the transverse pivot axis defined by pin 72.

Figure 9:
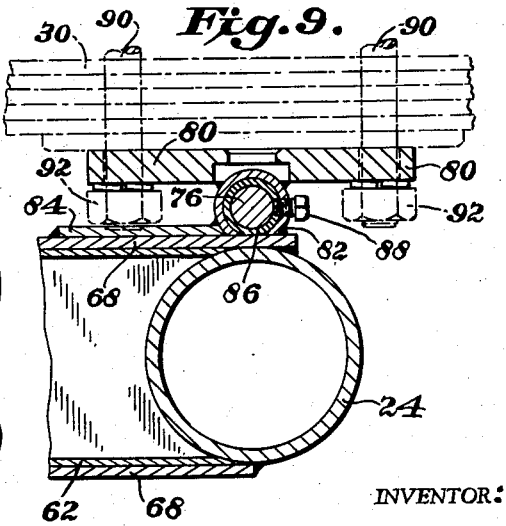
Figure 9 is a sectional view taken along line 9—9 of Figure 7.

The rear ends of plates 68 are rigidly attached to the axle 24, as by welding in the manner best seen in Figures 6 and 9, and a pin 76 forms a joint intermediate axle 24 and spring 30 to provide a transverse pivotal axis therebetween. As best shown in Figures 6–9, pin 76 extends between and through the spaced, apertured lugs 78 carried by the spring seating plate 80. Pin 76 also extends through the apertured lug 82, disposed between lugs 78, as shown, and carried by a brace 84 attached to the top plate 68. A bearing sleeve 86 may be arranged between lug 82 and pin 76 and suitable means, such as set screws 88 may be engaged to the lugs 78 and pin 76, as indicated in Figure 7.

In conventional manner, U-bolts 90 and nuts 92 may be used to hold the spring 30 on its seating plate 80, and the regions of top plate 68 may be cut away, as at 94, underneath the nuts 92 and at 96 underneath the lugs 78.

Thus, transverse pivot joints are provided at 72 and 76, as well as at 42, for permitting desired movements of the arm 58, spring 30 and axle 24 during all operating conditions.

Turning now to the structure and connections for the rear torque arm 60, axle 26 and spring 32, reference should be made to Figures 1, 1a, 3, 4, 5, 10 and 11 wherein arm 60 is shown as including the telescopically arranged tubular portions 98, 100, 102. These portions preferably are threadedly engaged together, as best shown in Figure 4, whereby they may be appropriately turned to vary the length of the arm. Suitable means for retaining these portions in an adjusted position may be provided. For example, as best seen in Figures 10 and 11, depending lugs 104 and 106 may be formed respectively at the forward, longitudinally split ends of portions 98, 100, with bolts 108 and nuts 110 arranged as shown for tightening the respective forward end around the inner telescoped portion. Although not shown, it will be evident that the forward portion of arm 60 may be slightly upwardly inclined, as in the case of the forward portion of arm 58.

A bushing 112 is carried at the front end of arm 60, welded or otherwise secured thereto, and is journalled on the pin or bolt 114 suitably mounted at the bottom of bracket 36, as best shown in Figure 2. Another bushing 116 of rubber or other suitable resilient material preferably is interposed between the bushing 112 and a bearing sleeve 118, the latter embracing the pin 114, also as shown in Figure 2. Spacer rings 120 may be disposed on pin 114, adjacent the side walls of the bracket.

The arm 60 preferably is connected to the axle 26 by means of the vertical bolt 122, acting as a pivot pin. In the illustrative embodiment, this is accomplished by providing a vertical bushing 124 at the rear end of the arm, engaged thereto and extending through upper and lower collars 126 carried by the rib members 128. These ribs are shown welded to the portion 98 and to the collars 126, and the bushing 124 may be similarly welded to the collars and the portion 98.

Bolt 122 extends through bushing 124, and an inner bushing 130 made of rubber or other suitable resilient material preferably is arranged between bushing 124 and a bearing sleeve 134 embracing the bolt (see Figure 4). An upper bushing 131 similar to 130 may also be provided within the upper end of outer bushing 124, or if desired, bushing 130 may be made substantially coextensive with the outer bushing.

Upper and lower support plates 136 are attached to the axle 26 and bolt 122. These plates may be of the triangular outline shown (see Figure 5) and preferably are welded to the axle at the places indicated in Figure 4, with guide bars 138 carried thereby and engaging the axle, as illustrated. The forward ends of these plates are apertured for insertion of the bolt 122 therethrough, and reinforcing apertured pads 140 (Figure 4) may be attached to the plates. As is evident, nut 142 detachably and firmly holds bolt 122 and the related parts in position. Suitable removable locking means for the nut 142 may be provided, such as a cotter pin 146 extending through the bolt and a castellation in the nut, as shown.

Figure 3:
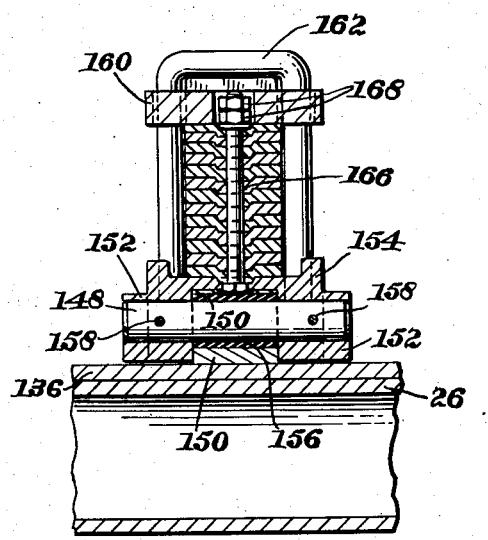
Figure 3 is a sectional view taken along line 3—3 of Figure 1.

Referring now to Figures 3–5, a transverse pivot pin 148 is arranged between the spring 32 and axle 26. This pin extends through an apertured lug 150 centrally mounted on the upper plate 136, as by welding, and also through apertured lugs 152 arranged on either side of lug 150 and carried by spring seat member 154 (see Figure 3). An appropriate bearing 156 may be disposed within lug 150, and suitable means such as lock pins 158 may be inserted through the lugs 152 and pin 148, as shown. Set screws or other known means may be used in lieu of pins 158.

Bottom spring seat member 154 may be used in conjunction with the upper U-bolt plate 160, U-bolts 162 and nuts 164, with a centrally located bolt 166 extending through the spring and having the tightening and locking nuts 168 thereon, as shown in Figures 3 and 4.

The simplified construction of the invention will be observed to include the advantages of a relatively free floating mounting of the springs 30, 32 with the pull on the frame being transmitted directly to the axles by the torque arms 58, 60, thus minimizing stress and strain on the springs. Furthermore, the pivotal connection between the axles 24, 26 and the springs 30, 32, together with the attachment of the arms 58, 60 to the axles whereby no relative movement between the axles and arms can take place about a horizontal transverse axis, will virtually eliminate the danger of axle turnover or undesirable weight shifting during application of the brakes. As is understood, the tendency of the front of the springs to move downwardly and the rear of the springs to move upwardly when the brakes are applied or the vehicle is otherwise rapidly decelerated, has produced undesirable weight shifting in suspension systems heretofore employed, resulting in what is known as brake chatter. With the present construction, the only variance in weight is through the arc of the torque arm, which is secured at its forward end as a joint, and produces only slight movement. It has been found that the springs 30, 32 do not swing or turn (about pivots 76 or 148) upon every application of the brakes, as would be involved in conventional assemblies. In other words, the equalizer 40 will not be turning with every application of the brakes.

In addition to eliminating brake chatter irrespective of road conditions or the amount of load being hauled, the suspension system of the invention will operate to prevent overloading of either of the axles when the brakes are applied, or when the contour of the road bed is irregular.

By virtue of the construction and arrangement of the rear torque arms 60 whereby they are longitudinally adjustable and are joined to the rear axle in a vertical pivotal connection, it will be possible to conveniently and expeditiously position the rear axle in proper alignment without sacrificing the benefits derived from having the pull transmitted directly from the chassis 20 to the axles through the torque arms.

The present invention will thus be seen to completely and effectively accomplish the objects enumerated hereinabove. It will be realized, however, that various changes and substitutions may be made to the specific embodiment disclosed herein for the purpose of illustrating the principles of this invention, without departing from these principles. Therefore, this invention includes all modifications encompassed within the spirit and scope of the following claims.

I claim:
1. A tandem axle assembly of the character described and including: a frame; front and rear leaf springs on opposite sides of said frame and slidably engaged thereto and extending longitudinally thereof; front and rear axles respectively engaged to the midpoints of said front and rear springs and extending transversely of said frame; front and rear torque arms on either side of said frame, said front and rear arms being respectively connected at their rear ends to said front and rear axles and extending longitudinally of said frame in substantial vertical alignment with said springs, said arms further being pivotally engaged at their forward ends to said frame for pivotal movement about a transverse horizontal axis; said rear arms including a longitudinally adjustable portion; the connection between said rear arms and their respective axles providing a vertical pivotal axis; the connection between said front arms and their respective axles being rigid; and the connections between said axles and said springs providing a transverse horizontal pivotal axis for pivotal movement of said springs relative to said axles.

2. The structure defined in claim 1 wherein said front arms at their rear ends are welded to their respective axles; and further wherein the rear arms are connected at their rear ends to their respective axles so as to be movable relative to said latter axles only in a generally horizontal plane.

References Cited in the file of this patent

UNITED STATES PATENTS

| | | |
|---|---|---|
| 2,417,690 | Keller | Mar. 18, 1947 |
| 2,577,322 | Frazier | Dec. 4, 1951 |
| 2,624,593 | Stover | Jan. 6, 1953 |
| 2,653,035 | Ward | Sept. 22, 1953 |

FOREIGN PATENTS

| | | |
|---|---|---|
| 19,256 | Australia | Sept. 25, 1929 |